Patented June 28, 1949

2,474,614

UNITED STATES PATENT OFFICE 2,474,614

COPOLYMERS OF VINYL ISOCOUMARANS WITH 1,3-DIENES AND PROCESS FOR OBTAINING SAME

Arthur L. Barney, Wilmington, Del., assignor to E. I. du Pont de Nemours & Company, Wilmington, Del., a corporation of Delaware No Drawing. Application September 19, 1946, Serial No. 697,902

12 Claims. (Cl. 260—86.5)

This invention relates to new and useful compositions of matter, and more particularly to polymeric materials.

This invention has as an object a class of polymeric materials comprising new copolymers which are characterized by improved tensile properties, and which are of particular value in the coating, molding and textile arts. Further objects reside in methods for obtaining these copolymers. Other objects will appear hereinafter.

The above objects are accomplished by copolymerizing at moderate temperature and in contact with a polymerization catalyst a mixture of certain vinyl isocoumarans which are defined below, and particularly 1,3-alkyl-4-vinylisocoumarans, with a 1,3 diene.

The above mentioned vinyl isocoumarans have the formula

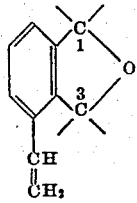

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

The present copolymers are obtained by reacting a mixture of polymerizable materials consisting wholly or preponderately of those defined above at a temperature of from about 10° C. to 200° C. in contact with a polymerization catalyst. The reaction is best carried out by contacting a mixture of the vinyl isocoumaran and a 1,3-diene with from 0.25 to 1.0% of a peroxygen compound such as potassium persulfate, based on the total weight of the monomers employed, and a suitable medium such as water, or in conjunction with water insoluble catalyst such as benzoyl peroxide, an organic solvent such as benzene. When employing an aqueous system, it is advantageous to use any of a number of commonly used emulsifying agents such as sodium oleate, and other emulsifying aids such as sodium dinaphthyl methane sulfonate, to aid in the proper dispersion of the monomers. In addition, it is preferred to employ 0.01 to 0.5% of an auxiliary catalyst such as potassium ferricyanide in conjunction with water soluble catalysts such as potassium persulfate. Other adjuvants, such as dodecyl mercaptan, commonly utilized as polymerization control agents may be employed as desired. The reaction medium, whether aqueous or non-aqueous, is not an essential constituent of the reaction mixture, but I prefer to employ one to aid in the proper mixing and dispersing of the monomers and catalyst with one another. The reaction may be carried out, however, without the inclusion of water and dispersing agent, or an organic solvent in the reaction mixture. The reaction may be run in a closed system or additional monomer or monomers may be injected from time to time as desired. The following examples in which the parts given are by weight, illustrate ways in which the invention may be practiced.

Example I

There is added to a suitable vessel, 75 parts of butadiene, 25 parts of 1,1,3,3-tetramethyl-4-vinylisocoumaran, 5 parts of oleic acid, 2.5 parts of sodium hydroxide, 1 part of emulsifying agent consisting of sodium dinaphthyl methane sulfonate, 0.5 part of potassium persulfate and 300 parts of copper-free distilled water, and the reaction mixture agitated for 16 hours at 50° C. The product, after cooling and opening the reaction vessel, is coagulated with an aqueous 10% acetic acid solution and brine, washed and dried by milling. There is obtained 98.5 parts of nervy, tough polymer. The rubber so prepared, when compounded with 2.0 parts of sulfur, 50 parts of a medium processing channel black, 2.0 parts of stearic acid, 5.0 parts of zinc oxide and 1.25 parts of 2-mercaptothiazoline, and cured for 45 minutes at 141° C., possesses a stress-strain value at 25° C. of 1280 p. s. i. at 300% elongation.

*Example II*

There is added to a suitable vessel, 75 parts of butadiene, 25 parts of 1,1,3,3-tetramethyl-4-vinylisocoumaran, 5 parts of soap, 0.3 part of potassium persulfate, 0.5 part of dodecyl mercaptan and 185 parts of copper-free distilled water, and the reaction mixture agitated for 16 hours at 50° C. The product, after cooling and opening the reaction vessel, is stabilized with 5 parts of a dispersion of a 55:45 mixture of phenyl-alpha-naphthylamine and diphenylamine, coagulated with an aqueous 10% acetic acid solution and brine, washed and dried by milling. There is obtained 92 parts of a slightly tacky, rubber-like polymer. The rubber so prepared, when compounded with 2.0 parts of sulfur, 50 parts of a medium processing channel black, 2.0 parts of stearic acid, 5.0 parts of zinc oxide and 1.25 parts of 2-mercaptothiazoline, and cured for 30 minutes at 153° C., possesses a stress-strain value at 25° C. of 3220 p. s. i. at 430% elongation as compared to a stress-strain value of 1240 p. s. i. at 340% elongation for a similarly compounded rubber using polybutadiene instead of the vinylisocoumaran/butadiene copolymer described above.

*Example III*

There is added to a suitable vessel, 75 parts of butadiene, 25 parts of 1,1,3,3-tetramethyl-4-vinylisocoumaran, 4.0 parts of oleic acid, 1.07 parts of sodium hydroxide, 1.0 part of the dispersing agent mentioned in Example I, 1.0 part of potassium persulfate, 0.15 part of potassium ferricyanide, 0.5 part of dodecyl mercaptan and 150 parts of copper-free distilled water, and the reaction mixture agitated for 16 hours at 50° C. The product, after cooling and opening the reaction vessel, is stabilized with 5 parts of a dispersion of a 55:45 mixture of phenyl-alpha-naphthylamine and diphenylamine, coagulated with an aqueous 10% acetic acid solution and brine, washed and dried by milling. There is obtained 103 parts of a slightly tacky, rubber-like polymer. The rubber so prepared, when compounded with 2.0 parts of sulfur, 50 parts of Micronex, 2.0 parts of stearic acid, 5.0 parts of zinc oxide and 1.25 parts of 2-mercapto-thiazoline, and cured for 30 minutes at 153° C., possesses a stress-strain value at 25° C. of 3080 p. s. i. at 400% elongation.

*Example IV*

There is added to a suitable reaction vessel 75 parts of chloroprene, 25 parts of 1,1,3,3-tetramethyl-4-vinylisocoumaran, 4.0 parts of rosin, 0.9 part of sodium hydroxide, 0.7 part of the dispersing agent mentioned in Example I, 0.4 part of potassium persulfate, 0.2 part of dodecyl mercaptan and 137 parts of copper-free distilled water, and the reaction mixture agitated for 4 hours at 40° C. The product, after cooling and opening the reaction vessel, is stabilized with 5 parts of X-789-N (a dispersion of a 55:45 mixture of phenyl-alpha naphthylamine and diphenylamine), and coagulated with an aqueous 10% acetic acid solution and brine, and washed and dried by milling. There is obtained 87 parts of soft, rubbery polymer.

Examples of 1,3-dienes useful in the practice of this invention include 1,3-butadiene hydrocarbons such as butadiene-1,3, 2,3-dimethyl butadiene-1,3, isoprene, piperylene and the like; halogen-substituted 1,3-butadienes such as 2-chlorobutadiene-1,3, 2-bromobutadiene-1,3, 2-iodobutadiene-1,3, 2,3-dichlorobutadiene-1,3, 2-fluorobutadiene-1,3 and the like; alkoxy-1,3-butadienes such as 2-methoxybutadiene-1,3, 2-phenoxybutadiene-1,3, and the like; and cyanoprenes such as 2-cyanobutadiene-1,3.

Examples of hydrocarbon substituents in the previously defined vinyl isocoumarans include methyl, ethyl, propyl, isobutyl, tertiary-butyl, isoamyl, hexyl, dodecyl, tetramethylene, pentamethylene, phenyl, tolyl, and xylyl. Other examples of the vinyl isocoumarans useful in the practice of this invention are 1,3-dimethyl-4-vinylisocoumaran, 1,3-dimethyl-1,3-diethyl-4-vinylisocoumaran, 1,3-dimethyl-1,3-dipropyl-4-vinylisocoumaran, 1,3-dipentamethylene-4-vinylisocoumaran, [4'-vinyldispiro-(cyclohexane-1,1'-isocoumaran-3'-1''-cyclohexane)], 1,3-dimethyl-1,3-diphenyl-4-vinylisocoumaran, 1,3-dimethyl-1,3-di(p-tolyl)-4-vinylisocoumaran and the like.

The vinyl isocoumarans most advantageously used in the practice of this invention are those in which the hydrocarbon radicals in the 1,3-positions contain from 1 to 6 carbon atoms, preferably alkyl.

The temperature employed within the previously mentioned range depend on the polymerizing characteristics of the particular unsaturated compound which is to be polymerized. In general, however, the preferred range of temperature is from about 30° C. to about 75° C., since within this range the above compounds polymerize at a satisfactory rate and in such a fashion that the reaction is readily controllable.

The process of this invention may be carried out under pressures varying from atmospheric or autogenous to 1000 atmospheres or higher, the upper pressure limit depending only on the apparatus available. In general, however, I prefer for reasons of convenience to carry out the polymerization at ordinary or autogenous pressures.

The use of water, or an organic solvent, is not an essential feature of the invention. However, in most cases, the use of water or an inert organic solvent is desirable to aid in the proper mixing and dispersing of catalyst and monomers. Examples of inert organic solvents which may be employed, instead of, or in addition to water, include hydrocarbons such as hexane, octane, isooctane, cyclohexane, methylcyclohexanes, benzene, toluene and xylenes, alcohols such as tertiary butanol, ethers such as diethyl ether and dioxane, esters such as ethyl acetate and ethyl benzoate, alkyl and aryl halides such as carbon tetrachloride, chloroform, ethylene dichloride, ethyl chloride and chlorobenzene, ketones such as acetone and cylohexanone, nitriles such as acetonitrile and benzonitrile, and the like. It is preferred to employ a dispersing agent, and other emulsifying aids such as Daxad-11 (sodium dinaphthyl methanesulfonate), to aid in the proper mixing and dispersing of water insoluble catalyst and monomers in aqueous systems. Any of a number of dispersing agents commonly employed in emulsion polymerizations may be used such as those containing as the active ingredients the sodium salts of higher alkyl sulfates such as sodium decyl, dodecyl and tetradecyl sulfates; the sodium salts of higher alkane sulfonates such as sodium decyl and dodecyl sulfonates; the monosodium salt of sulfated methyl oleate; the sodium salt of sulfonated oleyl acetate; sodium oleate; sodium rosinate and the like.

A wide variety of polymerization catalysts may be employed in the practice of this invention. Among the most useful of these catalysts are those compounds capable of initiating polymerization such as free radical generating materials represented by peroxygen and azo compounds, and inorganic acids and their metal salts. By peroxygen compounds is meant a compound containing the peroxygen linkage, —O—O—; and by azo compounds is meant a compound containing the azo linkage, —N=N—. As examples, there may be mentioned: peroxygen compounds such as di-acyl peroxides including di-benzoyl peroxide, benzoyl acetyl peroxide, di-lauroyl peroxide, di-acetyl peroxide and di-propionyl peroxide, di-alkyl peroxides including di-ethyl peroxide, dipropyl peroxide and di-(tertiary butyl) peroxide, hydrogen peroxide, inorganic peroxides including barium peroxide, magnesium peroxide and zinc peroxide, and salts of non-metallic inorganic peroxygen acids including ammonium persulfate, potassium persulfate, sodium persulfate, potassium percarbonate, potassium perphosphate and sodium perborate, the salts of peroxygen acids being especially effective if used in conjunction with minor proportions of an auxiliary catalyst such as sodium bisulfite, sodium hydrosulfite, potassium ferricyanide, etc.; azo compounds such as alpha,alpha'-azobis-(alpha,gamma-dimethylvaleronitrile), dimethyl and diethyl alpha,alpha'-azodiisobutyrate, 1,1'-azodicyclohexanecarbonitrile, alpha,alpha'-azobis(alpha - methylbutyronitrile), alpha,alpha'-azobis(alpha - ethylbutyronitrile) and alpha, alpha'-azobisdiisobutyrocarbonamide; and inorganic acids and their metal salts such as sulfuric acid, phosphoric acid, aluminum chloride, zinc chloride, boron trichloride boron trifluoride and the like. The catalyst should be employed in an amount in excess of 0.001% (based on the total weight of monomers), and preferably, there is employed between 0.1 and 1.0% of catalyst. Other adjuvants, such as dodecyl mercaptan, dialkyl xanthogeno sulfides and the like, commonly utilized as polymerization control agents may be employed as desired.

A small amount of the vinyl isocoumaran relative to the 1,3-diene yields products having properties and utility quite different from the polymer obtained by polymerizing either of these components alone. Thus the copolymer of Example II containing 25% of the vinyl isocoumaran and 75% of butadiene-1,3, when compounded into a tread stock has much greater tensile strength than a similarly compounded polybutadiene. The most useful copolymers are those containing on the basis of the weight of the copolymer from 5 parts of the vinyl isocoumaran and 95 parts of the 1,3-diene compound to 50 parts of the vinyl isocoumaran and 50 parts of the 1,3-diene compound. However, copolymers which differ appreciably from the separately polymerized components are obtained within the range of from 99 parts of the vinyl isocoumaran and 1 part of the 1,3-diene compound to 1 part of the vinyl isocoumaran and 99 parts of the 1,3-diene compound. Of particular utility are the copolymers containing from 20% to 40% of the vinyl isocoumaran based on the combined weight of the diene and the vinyl isocoumaran. These copolymers, as compared to those prepared from other proportions of these compounds and to the polymer obtained from either ingredient alone, exhibit a marked increase in tensile strength.

The vinyl isocoumarans used in the practice of the present invention are best prepared by the self-condensation of the corresponding (vinylethinyl)carbinol according to the method described in Chemical Abstracts, 37, 2343 (1943), and Chemical Abstracts, 39, 1619 (1945). For example, 1,1,3,3-tetramethyl-4-vinylisocoumaran can be readily prepared by the self-condensation of dimethyl(vinylethinyl)carbinol

which in turn can be obtained from monovinylacetylene and acetone. In this condensation two molecules of the carbinol yield one molecule of water and one molecule of vinyl isocoumaran having the structural formula previously given wherein all of the R substituents are methyl groups.

The copolymers described herein are useful in the manufacture of a large number of improved articles of manufacture. For example, when compounded and vulcanized in the usual manner, these compositions can be made into many useful articles of commerce, such as tires, tubing, massive articles, tapes for electrical applications, etc. When compounded and vulcanized in the usual manner, films and intricately shaped articles such as gloves, balloons and other hollow articles can be prepared from the latex by coagulation employing well known methods of straight dip, coagulating dip or porous-cup processes.

As many apparently widely different embodiments of this invention may be made without departing from the spirit and scope thereof, it is to be understood that I do not limit myself to the specific embodiments thereof except as defined in the appended claims.

I claim:

1. A copolymer comprising the copolymerization product of a vinyl isocoumaran and a 1,3-diene, said co-polymer containing, by weight of said vinyl isocoumaran and said diene from 5% to 95% of said vinyl isocoumaran, said vinyl isocoumaran being of the formula

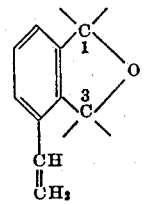

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

2. The copolymer defined in claim 1 in which one valence of each carbon atom in positions 1 and 3 in said vinyl isocoumaran is satisfied by an alkyl radical containing from 1 to 6 carbon atoms.

3. The copolymer defined in claim 1 in which said diene is a 1,3-butadiene hydrocarbon.

4. The copolymer defined in claim 1 in which said diene is a halogen substituted 1,3-butadiene.

5. The copolymer defined in claim 1 in which all the valences on each carbon in positions 1 and 3 in said vinyl isocoumaran are satisfied by $CH_3$.

6. The copolymer defined in claim 5 in which said diene is butadiene.

7. The copolymer defined in claim 5 in which said diene is chloroprene.

8. A process for obtaining copolymers which comprises reacting, in the presence of a polymerization catalyst at a temperature of from 10° C. to 200° C. and under a pressure of at least atmospheric, a vinyl isocoumaran and a 1,3-diene, said vinyl isocoumaran being present in amount of 5% to 95% by weight of said 1,3-diene and said vinyl isocoumaran, said vinyl isocoumaran being of the formula

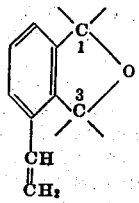

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

9. The process set forth in claim 8 in which one valence of each carbon atom in positions 1 and 3 in said vinyl isocoumaran is satisfied by an alkyl radical containing from 1 to 6 carbon atoms.

10. The process set forth in claim 8 in which all the valences of each carbon atom in positions 1 and 3 in said vinyl isocoumaran are satisfied by $CH_2$.

11. The process set forth in claim 10 in which said diene is butadiene.

12. The process set forth in claim 10 in which said diene is chloroprene.

ARTHUR L. BARNEY.

No references cited.